United States Patent [19]
Jensen

[11] 4,090,747
[45] May 23, 1978

[54] SELF PURGING BEARING AND BRACKET FOR DRIVE SHAFT OF A WHEEL MOVE IRRIGATION LINE

[76] Inventor: Arthur E. Jensen, 11372 SW. Skyline, Santa Ana, Calif. 92705

[21] Appl. No.: 745,391
[22] Filed: Nov. 26, 1976
[51] Int. Cl.² .............................................. F16C 35/00
[52] U.S. Cl. ..................... 308/30; 239/212; 308/196
[58] Field of Search ............. 308/1 R, 27, 28, 30, 308/193, 196; 248/55, 231; 239/212, 178; 85/37

[56] References Cited

U.S. PATENT DOCUMENTS

| | | | |
|---|---|---|---|
| 429,578 | 6/1890 | Niedringhaus | 85/37 |
| 605,940 | 6/1898 | Walker | 308/193 |
| 1,648,338 | 11/1927 | Gaines | 248/231 |
| 1,836,878 | 12/1931 | Sauer | 248/231 |
| 2,826,464 | 3/1958 | Hawk et al. | 308/28 |
| 3,147,764 | 9/1964 | Jensen | 239/212 |

*Primary Examiner*—Trygve M. Blix
*Assistant Examiner*—Charles E. Frankfort
*Attorney, Agent, or Firm*—Frederick E. Mueller

[57] ABSTRACT

Two formed sheet members secured together in face to face relationship by integral rivets together define a bracket with a central ball race and a plurality of drain passages radiating radially outwardly from the race. Leg portions formed along one margin of each of the identical pair of members define a saddle for seating the bracket on a pipe. An identical pair of wire straps are interconnected to opposite ends of a spring and at the other ends are hooked to the bracket, the straps having shape characteristics such that the spring force is applied in the plane of abutment of the two members.

4 Claims, 4 Drawing Figures

SELF PURGING BEARING AND BRACKET FOR DRIVE SHAFT OF A WHEEL MOVE IRRIGATION LINE

BACKGROUND OF THE INVENTION

The present invention relates generally to bearings for rotary shafts and, more particularly, to bearings for the drive shaft of a wheel-move agricultural irrigation pipe line of the so-called "side-roll" type.

Typically, a wheel-move irrigation apparatus comprises a plurality of sections of pipe which are coupled together into a string which may be as long as a quarter or a half mile. A plurality of wheels are coaxially rigidly fixed at spaced apart points along the string so that when torque is applied to the wheels or pipe the entire string is moved sideways from one area to another in the field to be irrigated. In the end-drive side-roll type of irrigation apparatus, as in my U.S. Pat. Nos. 2,946,515 and 3,147,764, the wheel supported string has a plurality of power transmission units spaced therealong but actuated from a single prime mover at one end of the string through a single drive shaft extending for a major part of the string to the most remote of the power transmission units. The long drive shaft is supported in bearing brackets at intervals to about 6 feet and there may be as many as 200 bearing brackets in a quarter mile line.

As will be apparent from a consideration of my aforementioned patents, there drive shaft bearings are subjected to a rigorous environment in their field of operation. Soils find their way into the ball race and interfere with the free function of the balls in addition to which the abrasive action of the residues entering the bearing eventually bring out permanent damage. Accordingly, it is highly desirable to improve service life by allowing elements trapped within the bearing to be washed out and to bleed out as a result of the sprinkling action and to leave the ball race clear. Additionally, in view of the very great number of bearing brackets which must be employed in a single line, it is highly desirable to devise bearing brackets having a minimum number of parts, minimum material in the parts and a means to assemble the several parts into the completed bearing in an economical fashion. The bearing bracket also should be installable and replaceable with a minimum of tools and skill.

SUMMARY OF THE INVENTION

A bearing case and bracket is defined by an identical pair of sheet metal stampings secured together in face to face engagement by rivet defining portions of the stampings. The identical pair of members are so configured that they together define a race for a circular array of balls in which a portion of the rotary drive shaft is supported and, also, define a plurality of water passages extending radially to and from the race. The spacing circularly between the set of channels guarantees at least one channel subject to a gravity flow component and an infinite number of cases where two channels are subject to gravity flow, irrespective of the position of the bracket radially with respect to the pipe on which it is supported. Along one margin the identical pair of members are formed with leg portions which in the assembled bracket define a saddle for engagement of the bearing bracket on the pipe. An identical pair of wire straps each have one end hooked into a rivet hole on one side of the bearing bracket, the other ends of the pair of wire straps being hooked to opposite ends of a spring on the opposite side of the pipe from the bearing bracket. The pair of wire straps are configured such that the spring force is applied in the abutment plane of the two identical bracket plates.

DESCRIPTION OF THE PREFERRED EMBODIMENT

Figure 1:
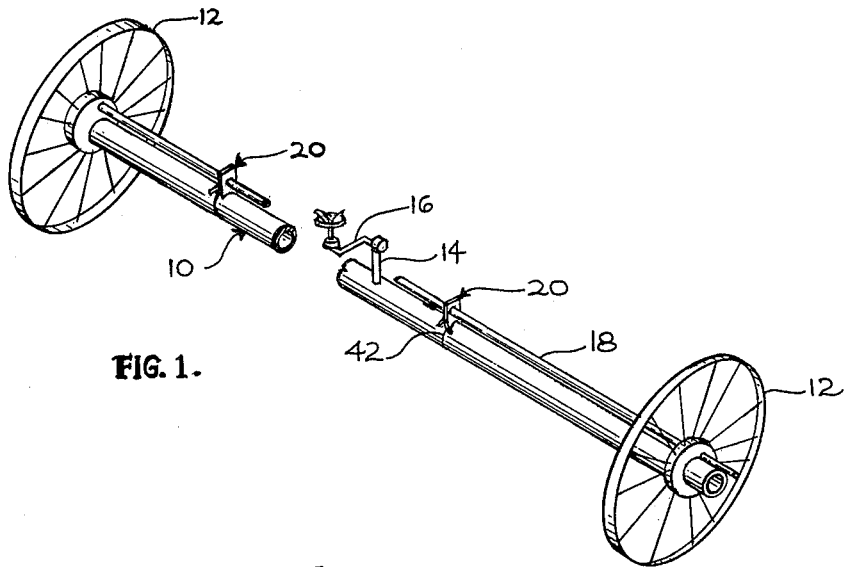
FIG. 1 is a schematic perspective view of a portion of a side-roll agricultural irrigation pipe line, illustrating a spaced pair of the bearing brackets of this invention supporting the drive shaft.

FIG. 1 schematically illustrates a portion of a side-roll agricultural irrigation wheel-move line which in its entirety may be up to one half mile long. The string 10 is made up of coupled sections of pipe coaxially rigidly mounting a plurality of spaced wheels 12, e.g., on the order of 40 feet apart. At spaced intervals therealong the string 10 is fitted with radially outwardly projecting risers 14 each of which mounts a self-leveling, self-aligning sprinkler head assembly 16 such as is disclosed in my U.S. Pat. No. 3,045,922. Assuming the pipe line of FIG. 1 to be stationary at one position in a field, it will be understood that water is supplied to the string 10 from one end thereof for distribution onto the crops by the plurality of sprinkler assemblies 16.

After one area of the field has been sufficiently irrigated, the water is shut off and the string of pipe is rolled sideways to the adjacent unirrigated area of the field. In the apparatus of the type of my U.S. Pat. Nos. 2,946,515 and 3,147,764, the power for movement of the long line is provided by a prime mover connected to one end of the string of pipe whose torque is delivered along the length of the pipe to spaced torque transmission units by means of a drive shaft 18, which is supported at intervals by bearing brackets 20 of the present invention secured to the string of pipe 10. The construction and mode of operation of the end-drive side-roll irrigation lines of my prior invention is now well known and understood in the art. For present purposes, suffice it to say that when the line has been moved to the next unirrigated section of the field, and arrested in the new position, the radial direction of the bearing brackets 20 with respect to the pipe 10 may be at virtually any inclination within 360° around the axis of the pipe. The same variations of orientation will occur with respect to the sprinkler assemblies 16 and drive shaft 18 which may, for example, be extended horizontally sidewardly with respect to the string of pipe.

The bearing bracket 20 comprises an identical pair of plates 22. Preferably, the plates 22 comprise stampings made up of essentially rectangular stainless steel plates with a centrally located circular opening 24 for the passage of the drive shaft 18. The marginal portion of each plate around the opening 24 is formed into half an annular ball race seat 26 from which a plurality of circularly spaced apart and radially outwardly extending channel shaped portions 28 extend toward the outer edge of the plate. Preferably, each plate is formed with four of the channels 28.

Figure 3:
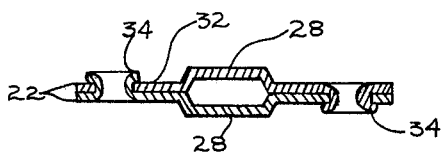
FIG. 3 is a section on the line 3—3 of FIG. 2.

In order to secure the pair of plates 22 together, to form the bracket 20, each plate is formed with four corner holes on a given circle equally spaced with respect to the axis of the hole 24. One pair of holes 30 on one side of the plate are smaller than the other pair of holes 32 on the opposite side of the plate. A pair of the plates 22 are then placed face to face such that each pair of smaller holes 30 of one plate is in registration with the larger pair of holes 32 of the companion plate. The margin of the smaller hole is then used as a grommet and turned over on the periphery of the larger hole, thus forming a hollow rivet 34. This is clearly visible in FIG. 3, which also shows the configuration of a conduit formed by the registration of channels 28 of the two plates 22.

Figure 4:
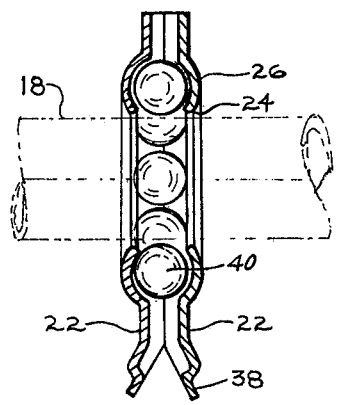
FIG. 4 is a section on the line 4—4 of FIG. 2.

As can be seen in FIG. 4, the pair of plates 22 together define a complete ball race for balls 40, which may be of synthetic plastic, e.g., polypropylene, in which the drive shaft 18 is rotatably mounted. At the same time the balls 40 are exposed to the generous flow area provided by the conduits defined by the channels 28, the ball bearing race portions 26 serving to adequately entrap and provide ample bearing surface for the balls despite interruption of the race by the open inner ends of the conduits. As will also now be apparent, rotation of the pipe 10 to any position within a 360° range, with corresponding radial orientation of the bracket 20, nevertheless results in an orientation of conduits both in position to receive irrigation water for washing out or flushing the race and balls and for gravity draining through other channels.

Figure 2:
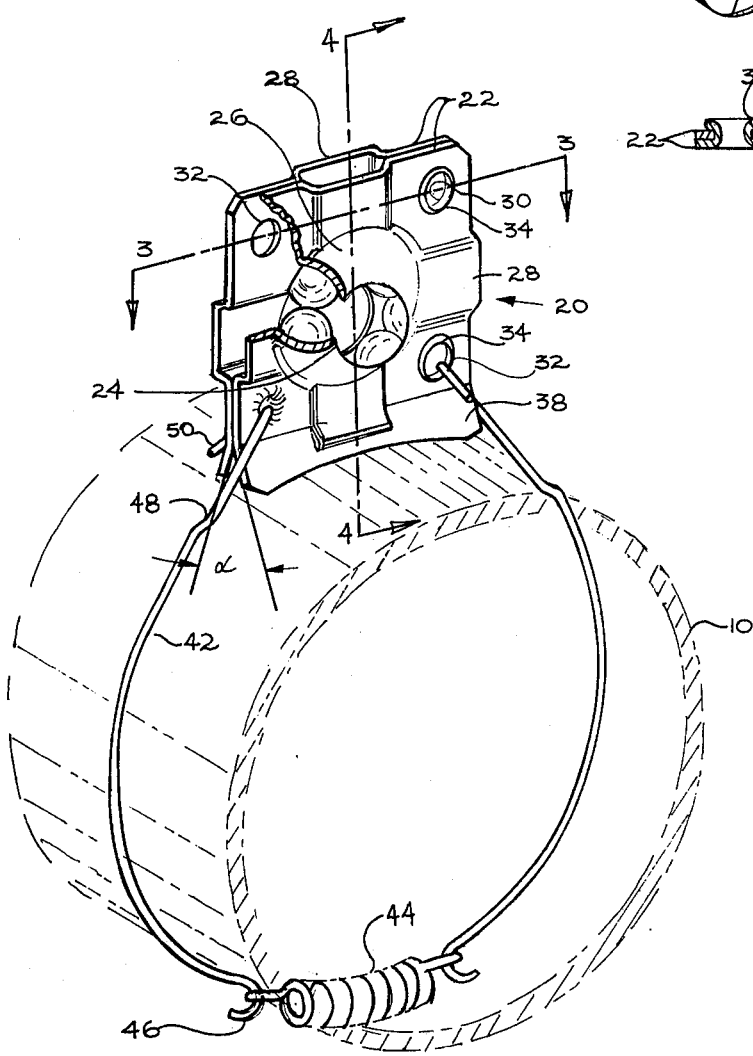
FIG. 2 is a perspective view, on a larger scale, of the bearing bracket of this invention, with portions cut away and, also, showing in phantom outline a section of the pipe on which it is supported.

A lower margin (as viewed in FIG. 2) of each plate 22 is obliquely angled to form a leg portion 38 such that the pair of legs of the assembly 20 define a saddle, each of the legs having an edge radius to matingly engage the pipe surface. The bracket 20 is fixedly secured in place in the desired radial orientation to the pipe 10 by an identical pair of wire straps 42 and a coil spring 44. At one end each of the straps 42 is formed with a C-hook portion 46 engagable with one of the eyes in the ends of the spring 44. Each of the straps 42 at its other end is formed with a joggle 48 and thus terminates in an offset J-hook portion 50, which is passed through one of the adjacent tubular rivets 34 of the bracket 20. With this configuration of strap 42 the strap passes over a lower leg 38 and joggles back to lie and extend around the pipe 10 in the plane of abutment of the pair of plates 22 so that the pulling force of the spring 44 is applied at the center of the assembly. The pair of wire straps 42 and spring 44 may be interconnected by means of a simple button hook. In any event, as a result of the angle alpha shown in FIG. 2, the edges of the sheet metal legs are presented to the surface of the pipe 10 in such a manner to slightly dig in and resist displacement.

In carrying out the invention variations from the specific details set forth above may be possible. Accordingly, such variations are within the spirit and scope of the following claims.

I claim:

1. A self purging drive shaft bearing for a wheel move irrigation pipe line comprising:

a bearing bracket including a pair of plates disposed in face to face contact and having central coaxial openings through which the irrigation pipe line drive shaft is adapted to extend, and means joining said plates, said plates having first spaced confronting annular wall portions about said opening which are curved in cross-sectional planes containing the common axis of said openings and form between said wall portions a generally toroidal radially inwardly opening bearing race, ball bearings within said bearing race for rotatably supporting said drive shaft, said plates having second spaced confronting wall portions radially outward of said bearing race forming channels circumferentially spaced about said bearing race and extending radially from said bearing race to the outer perimeter of said bracket through which water may pass to flush dirt and other debris from said bearing race, said plates having spaced corresponding edge portions along one edge of said bracket forming legs for seating against said irrigation pipe line, and said legs forming therebetween a flow space open at its ends and communicating with one of said channels through which water may pass.

2. The bearing of claim 1 wherein:

said plates have contacting portions about said bearing race, said plate joining means comprise pair of aligned holes in said contacting plate portions and adjacent the ends of said bracket edge, and one hole of each hole pair being bounded circumferentially by an edge portion of the respective plate which projects axially through and then radially outward over the edge of the other hole of the respective hole pair to form a hollow rivet-like connection between said plates.

3. The bearing of claim 2 including:

a tension spring having hooks at its ends engagable through the openings in said hollow rivet-like connections for securing said bearings to said irrigation pipe line.

4. The bearing of claim 1 wherein:

said bracket plates have aligned holes adjacent the ends of said bracket edge and extending through the plates parallel to said axis for use in attaching said bearing to said irrigation pipe line.

* * * * *